United States Patent [19]

Lambeth

[11] 4,101,947

[45] Jul. 18, 1978

[54] NARROW TRACK MAGNETIC-HEAD RECORDER

[75] Inventor: David Noel Lambeth, Webster, N.Y.

[73] Assignee: Eastman Kodak Company, Rochester, N.Y.

[21] Appl. No.: 729,553

[22] Filed: Oct. 4, 1976

[51] Int. Cl.² ..................... G11B 5/32; G11B 11/10
[52] U.S. Cl. .................................. 360/114; 360/18; 360/135
[58] Field of Search ............... 360/114, 121, 56, 66, 360/57, 58, 133, 135, 40, 18–20; 350/151

[56] References Cited

U.S. PATENT DOCUMENTS

| | | | |
|---|---|---|---|
| 2,968,799 | 1/1961 | Smith | 360/114 |
| 3,474,431 | 10/1969 | Griffiths | 360/114 |
| 3,513,456 | 5/1970 | Nelson | 360/114 |
| 3,624,622 | 11/1971 | Chen | 360/114 |
| 3,629,517 | 12/1971 | Grimm | 360/114 |
| 3,668,332 | 6/1972 | Anderson | 360/121 |
| 3,668,671 | 6/1972 | Everett et al. | 360/114 |
| 3,701,846 | 10/1974 | Zenzefilis | 360/19 |
| 3,739,362 | 6/1973 | Eschelbach | 360/114 |
| 3,781,905 | 12/1973 | Enrique et al. | 360/114 |
| 3,925,816 | 12/1975 | Kihara | 360/19 |

*Primary Examiner*—Alfred H. Eddleman
*Attorney, Agent, or Firm*—Thomas H. Close

[57] ABSTRACT

Information is recorded on a magneto-optic medium having a predominant proportion of preferred domain orientations with a substantial component normal to a recording surface thereof, by using a fringe field component from a magnetic-head. At least one magnetic head is utilized and such head is passed over the medium in a predefined track pattern which incorporates substantial overlapping of adjacent track portions. With such overlapping, only a residual portion of a track as originally laid down remains unerased in the final recording, and such residual portion is narrow in relation to head width. A high-resolution optical playback device is then preferably employed to extract the recorded information from the compact residual track.

14 Claims, 6 Drawing Figures

NARROW TRACK MAGNETIC-HEAD RECORDER

BACKGROUND OF THE INVENTION

1. Field of the Invention

The present invention relates generally to the magnetic recording of information signals and in particular to the recording of such signals on a magneto-optic medium.

2. Description Relative to the Prior Art

The use of magnetic heads to lay down and respond to records on a magnetic medium is well known and is undoubtedly the most frequently employed approach to magnetic recording/playback. The "magnetic-head record/playback approach" results, generally, in compact systems which are economical in relation to alternative approaches such as optical recording and playback. One disadvantage, however, is that mechanical requirements for the magnetic heads tend to work against reduction in head size beyond a certain range. For this reason, practical head sizes, generally, produce track widths which do not use to full advantage the resolving power of the magnetic recording medium (e.g., magnetic tape). A further source of difficulties is the limited ability of magnetic heads to play back very low frequencies. This problem results because playback using magnetic heads is an induced-voltage type of process and is strongly influenced by the magnetic flux change per unit time $(d\phi)/(dt)$. In fact, at low levels of $d\phi/dt$ the induced signal may become so small as to be totally obscured by noise and for this reason such low frequency signal components are generally avoided in recording with magnetic heads.

Some optical record/playback systems have been developed which rely on Kerr, or on Faraday, magneto-optic effects and avoid the resolution and low frequency (such optical effects are not $d\phi/dt$ dependent) problems of the magnetic head approach. Such optical systems, however, generally incorporate a powerful recording laser which, with associated drive electronics, is expensive and bulky. Also, the safety concerns with powerful lasers militate against their use in apparatus for the general consumer.

SUMMARY OF THE INVENTION

The invention proposes to record information on a magneto-optic medium using one or more magnetic heads operated so as to overlap tracks to a large degree, and then to play back that information from narrow residual tracks i.e., those narrow record portions not erased by overlapping, using high resolution optical readout apparatus. The magneto-optic medium is preferably a planar magnetic medium such as a tape or a disc having a significant proportion of magnetic domains with a preferred orientation having a substantial component normal to the plane of the medium. (Here "substantial component normal to the plane" is meant to indicate that the domains have a magnetic component normal to the plane of the medium which component is at least one third of the overall magnetic remanence vector, the preference being toward no parallel component insofar as that is achievable.)

In part, the invention is based on a recognition that magnetic heads, which are typically intended to record on a medium having a preferred magnetic domain orientation parallel to the plane of the medium, can be employed for switching of domain components normal to the plane of a magneto-optic medium (such as a disc coated with terbium-iron, manganese-bismuth, holmium-cobalt or cobalt chromium iron oxide) and that, in so recording, the record tracks produced can be largely overlapping, say 90% overlapping or more, while still leaving a substantially uncorrupted series of narrow residual tracks.

In the prior art, record tracks have been overlapped to a fairly large degree in some systems employing magnetic heads for both "record" and "playback". With such systems, however, overlapping is made tolerable by recording rather similar material in each succeeding track so that the playback heads see some sort of averaged signal which generally changes with each succeeding head swipe (this approach is taken, for example, in some video recorders). The present invention, on the other hand, utilizes optical playback apparatus . . . which is not $d\phi/dt$ dependent . . . to read back the information "within" the individual narrow residual tracks without significant cross talk and in so doing so avoids any need to work with averaged signals.

Such optical apparatus is preferably of the Kerr or Faraday effect type and the normal domain characteristic mentioned above affords a large magnetic component for purposes of rotating a polarized detection beam arriving at a steep angle to the medium as is discussed below.

Hence using the approach of the present invention for information recording it is possible to realize, to a degree, the record density and low frequency response advantages of a totally optical record/playback system while also realizing the cost and compactness advantages of magnetic-head recording.

The invention, it should be appreciated, may, for example, be employed in computer information storage apparatus, in electrophotographic copying, in facsimile apparatus, and, as for the presently preferred implementation described below, in video recording apparatus.

The invention will now be described in detail with reference to the drawings, wherein.

Figure 1A:
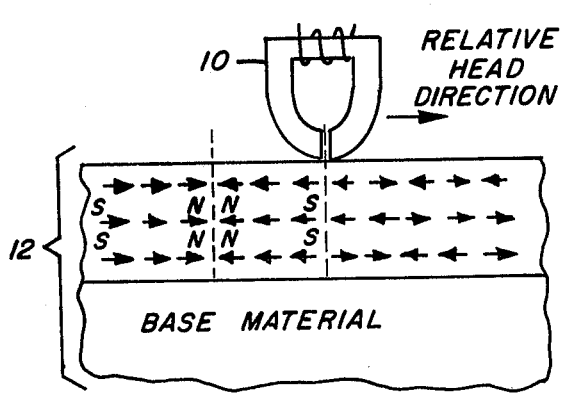
FIG. 1A is a teaching diagram indicating a magnetic head influencing a conventional magnetic recording medium.
Figure 1B:
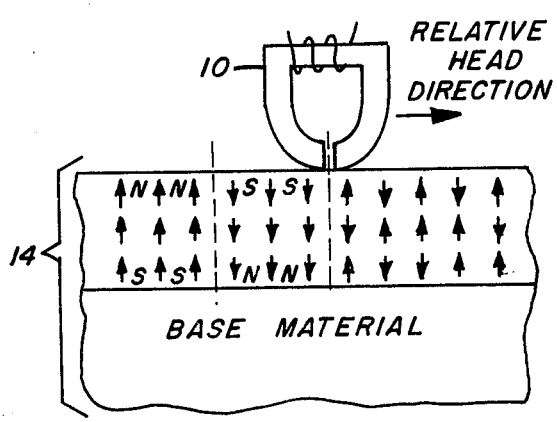
FIG. 1B is a teaching diagram indicating a magnetic head influencing a material which has preferred normal remanence.

Before describing apparatus according to the invention, the underlying principles of the invention are considered: Referring to FIGS. 1A and 1B, a magnetic head 10 is indicated, somewhat symbolically, as influencing the domain orientation of magnetic media 12 and 14 respectively. The magnetic medium 12 has a preferred domain orientation parallel to the plane of such medium (indicated by arrows) as is usual for magnetic-head-type recording. With such a medium, the magnetic head typically moves in a plane parallel to the plane in which the magnetic domains have their preferred orientations.

For recording according to the invention, on the other hand, a predominant proportion of the magnetic domains are caused to have a substantial magnetic field component which is perpendicular to the plane of the medium (as mentioned above at least a component of one third the overall magnetic remanence vector is believed necessary for satisfactory record/playback). In fact it is preferred for the overall magnetic remanence field vector to be aligned perpendicular to the plane of the medium. Also the material must be magneto-optic or that is, it must have relatively stronge Kerr and/or Faraday effects on light.

Prior art magneto-optic recording is typically effected by heating a small spot or area with laser to demagnetize a spot on a medium . . . by raising to the Curie point temperature or above . . . for thereby allowing a reverse orientation representing an information "bit" to form upon cooling. This orientation reversal occurs as a result of the reversing influence of an internal magnetic field of such a medium or an applied external field.

Figure 2:
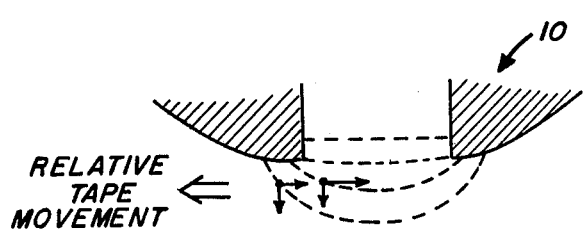
FIG. 2 is a cross-sectional view indicating magnetic field components at a magnetic head gap.

The present invention, does not employ such Curie-point recording, but rather a magnetic head, say the head 10, acts on a magneto-optic medium, which has a preferred domain alignment having a substantial normal component (pointing either "up" or "down") relative to the recording surface. As is indicated in FIG. 2 the invention recognizes that a component of the field produced by a magnetic head can be utilized to influence the ordering of such domains. Such component is normal to the gap, and as such is perpendicular to the component conventionally used (components normal and parallel to the gap are indicated by arrows in FIG. 2).

In any event, by applying a signal of sufficient strength to such head, an ordering of domain orientations representative of such signal may be produced, such orientations being, for the most part, substantially normal to the recording surface.

Figure 3:
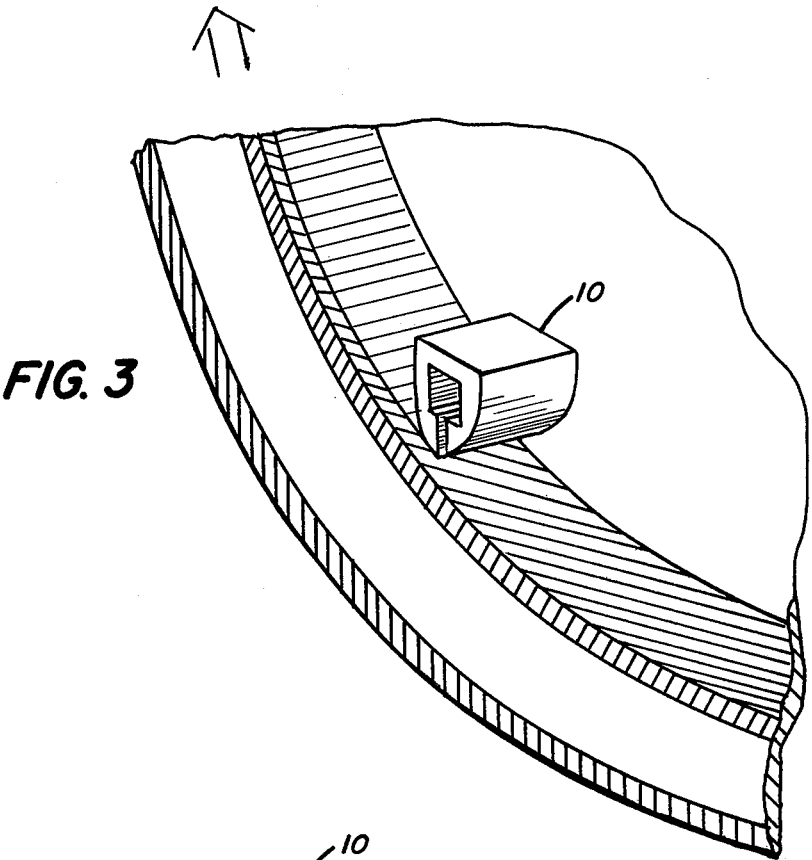
FIG. 3 is a teaching diagram indicating substantial record track overlapping using a magnetic head.

FIG. 3 serves to illustrate the substantial overlapping which, according to the invention, is employed to compress records into residual (unerased) track portions which are compactly spaced and are narrow in relation to head width. As is discussed more fully below, by recording on a medium, say tube or a disc, having magnetic domains normal to a recording surface thereof, and doing so with highly overlapped head scans the record which is produced has high information density and advantageously lends itself to high resolution playback based on magneto-optic effects.

The invention is now described in the presently preferred embodiment of a video disc recorder/playback device. It will, however, be appreciated that the invention may be employed in various information storage situations, such as, for example, in facsimile transmitters and receivers or in computer memory devices, and has particular advantage where a storage density somewhat greater than that for conventional magnetic-head recording is desired.

Figure 4:
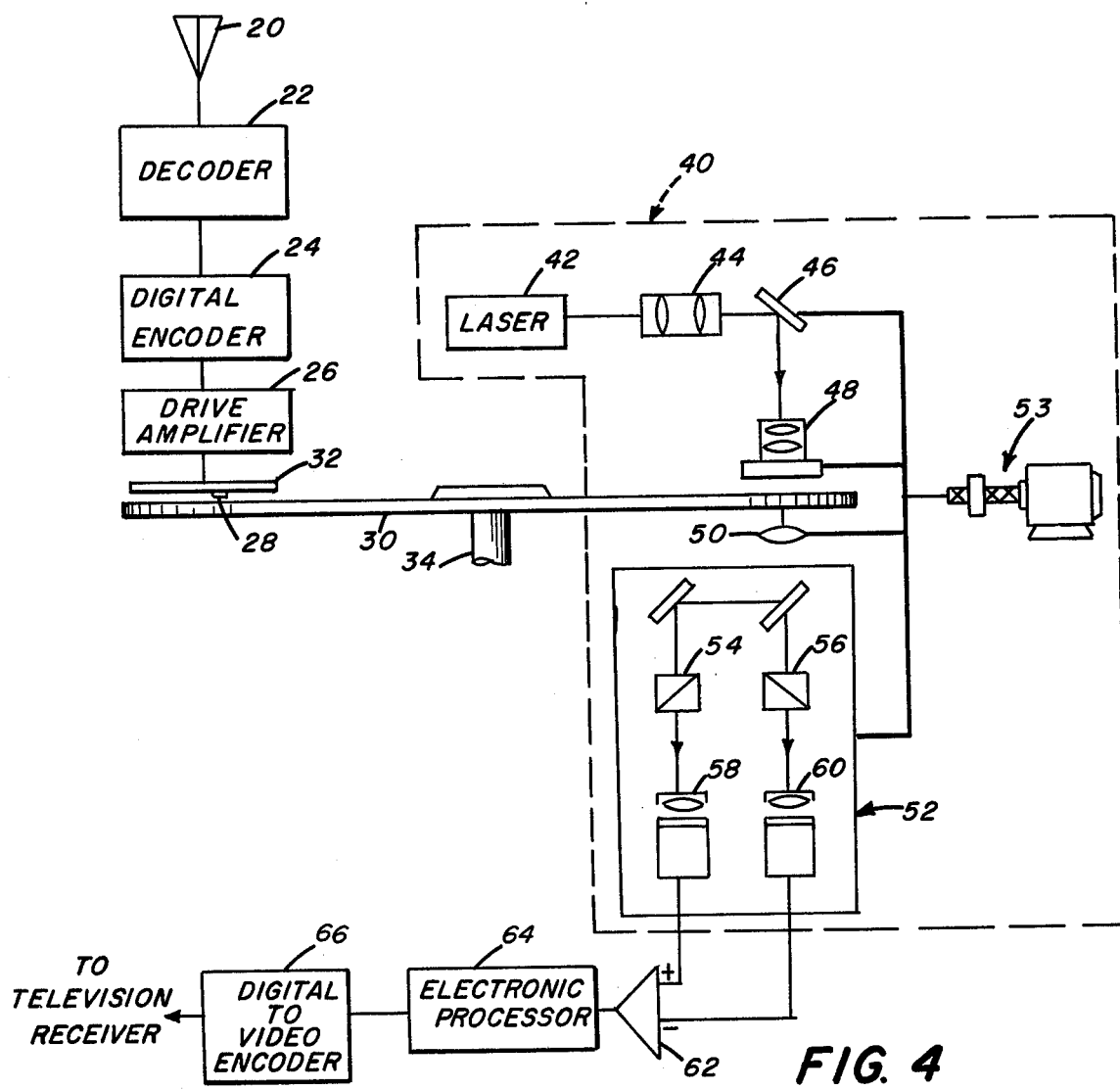
FIG. 4 is a diagram, generally in block form, for use in describing a presently preferred implementation for the invention.

Referring now to FIG. 4, a video record/playback unit includes a suitable antenna 20 for receiving a video broadcast signal and a decoder 22 for separating the luminance and chrominance signals (as are present, for example, in the NTSC broadcast signal format). A digitizer 24 is preferably employed to convert the video signals to a digital format for recording. It should be noted at this point that an FM recording format may be used alternatively.

An amplifier 26 is utilized to provide sufficient signal strength to drive a magnetic head 28 for influencing the domain orientations on a magneto-optic disc 30.

The head 28 is preferably mounted on a flying disc holder 32, as is well known, and suitable transport means (not shown) is provided to move the head radially over the disc, e.g., a precise worm gear drive. The disc is rotated by a spindle 34 and the rotational speed of the spindle is coordinated to the radial advance rate of the head to afford a predefined degree of track overlap, say 90 percent of the gap width. For 90 percent overlap, for example, the head advance rate times the period for one spindle rotation should equal one-tenth of the head width. Desirably the overlap is chosen to provide an uncorrupted track of width corresponding to the optical spot size of the playback apparatus.

For playback, a Faraday effect optical reader 40 is preferably employed. Therefore, the disc 30 must be somewhat transparent, e.g., a glass support with a thin layer of terbium iron or manganese bismuth. (It should be appreciated that an opaque magneto-optic disc could be used in conjunction with a Kerr effect reader, i.e., a reader which detects the magnetic rotation of a light beam during reflection.)

The reader 40 employs a laser 42 . . . a low power helium-neon laser is adequate for playback as mentioned above . . . which directs a polarized light beam (scanning beam) onto a beam expander 44 which is adapted for adjusting beam diameter. The scanning beam is then directed by a mirror 46 onto a flying-type focusing objective 48. The beam angle of incidence is preferably steep relative to the medium, and the normal orientation characteristic of the domains, discussed above, tends to provide a relatively large magnetic component for causing a rotation of the beam polarization direction i.e., a magnetic component in a direction parallel to the beam.

Collecting optics 50 and a beam processor 52 are located on the opposite side of disc 30 to receive the beam after modulation thereby. Tracking is achieved by advancing the mirror 46, the focusing objective 48, the collecting optics 50 and the beam processor 52 using such means as a precise lead screw drive 53. Alternatively a mirror type beam steerer controlled by a feedback signal could be employed for tracking purposes.

During operation, the scanning beam, after passing through the objective 48, is influenced (Faraday effect) by the residual magnetic track on disc 30 and passes to the beam processor 52.

Within the beam processor 52, the beam is split into first and second components which are directed to analyzers 54 and 56, respectively. The analyzers are arranged to have polarization direction which are shifted equal and opposite amounts from a 90° rotation relative to the polarization direction of the scanning beam when such scanning beam is not under magnetic influence. With this arrangement a magnetic rotation is one direction causes the light beam transmitted through one analyzer to increase and that for the other analzyer to decrease, and vice versa for an opposite magnetic rotation. The amount of shift relative to 90° is selected to provide the greatest signal to noise ratio. Electrical signals representative of the outputs of analyzers 54 and 56 are produced by detectors 58 and 60 respectively, and these signals are differenced at an amplifier 62 to produce a signal representative of the magnetic record. (Note the individual detector signals are also representative of the magnetic record and may be used directly, but the differencing operation serves to remove certain types of noise.)

The difference signal is supplied to an electronic processor 64 which includes pulse squaring circuitry for removing noise and reshaping the digital pulses to improve signal quality.

The digital signals from processor 64 are then applied, for example, to an NTSC format generator 66 which produces a signal suitable for display by a standard television reciever.

Figure 5:
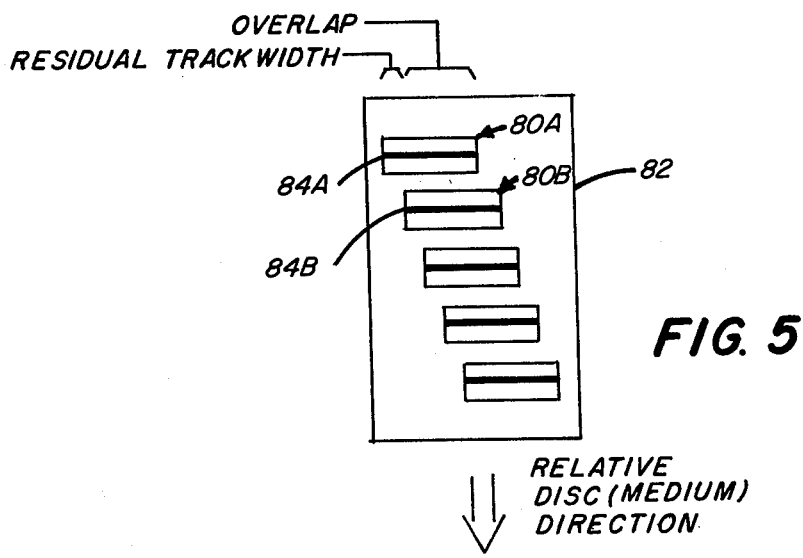
FIG. 5 is a simplified representation of a multiple gap head unit for use in practicing the invention.

A special refinement suitable for use in systems according to the invention is the multiple gap head unit of FIG. 5. Such unit comprises a number of separate heads 80 (A, B..) having individual input coils and magnetic circuits. The heads are mechanically held together as a single unit, say, by a non-magnetic potting compound 82, and are arranged one behind the other with the individual gaps 84 (A, B ...) slightly staggered. Preferably, the gaps 84 are slightly offset in a single direction and, by applying respective signals to the head inputs, a series of highly overlapped record tracks may be laid down in a single head swipe. Thus, for example, chrominance, low frequency luminance, and high frequency luminance signals could be laid down simultaneously in individual tracks that are closely spaced in relation to individual head width.

The invention has been described in detail with particular reference to a presently preferred implementation thereof. It will, however, be appreciated that variations and modifications are possible within the spirit and scope of the invention. For example, the invention may be used in a variety of information recording situations, such as for computer information storage and retrieval. Such information recording systems would generally be non-destructive of the recording medium, i.e., the medium could be used for subsequent recording. The degree of overlap employed could be varied over a wide range; however, record density would, of course, increase with increased overlapping. As a counterbalancing concern, tracking tends to become more difficult as track width diminishes. An eighty to ninety percent overlap appears to yield a desirable balance between these considerations for conventional heads with gap widths in the 50 to 100 micron range.

While manganese bismuth or terbium iron thinly coated on a transparent support are possibilities for a recording medium, a tape or disc with magneto-optic material distributed therein could, for example, also be used.

What is claimed is:

1. A process for magnetically recording an information signal on a planar magneto-optic medium of the type having a predominant proportion of magnetic domains in an orientation exhibiting a substantial magnetic component normal to a recording surface of said medium, the information signals being adapted to be reproduced by relatively high resolution optical playback apparatus employing a polarization detection beam oriented at a relatively steep angle to the recording surface, said process comprising:

moving a magnetic head, adapted to produce a magnetic field component normal to a recording surface, relative to the recording surface of such a medium along a predetermined track path, which, based on head width, incorporates a significant degree of track overlapping; and applying the information signal to said magnetic head during such movement relative to the medium, such signal acting through said head to produce said magnetic field component normal to the surface in proportion to the signal to thereby induce domain orientation changes in the normal magnetic component of said medium, whereby the signal is recorded as orientations of magnetic domains in a narrow residual track portion and whereby the economy of magnetic recording is achieved in combination with the high information storage density of a magneto-optic storage medium.

2. A process according to claim 1 wherein said head moves relative to said medium in substantially parallel linear tracks which are more than eighty percent overlapping, whereby the unerased track portions have a width which is less than twenty percent of the head width.

3. A magneto-optic unit bearing magnetically recorded information for use in optical playback apparatus employing a polarization detection beam oriented at a relatively steep angle to a recording surface of the unit, such unit being produced by the process comprising:

(a) using a planar magnetic medium exhibiting a preferred magnetic domain orientation having a substantial component normal to the recording surface of said medium;

(b) causing relative movement between said medium and a magnetic head adapted to produce a magnetic field component normal to the recording surface of the medium to define a predetermined recording track path which is substantially overlapping; and (c) applying an electrical information signal to said head, during such relative movement, which signal produces a magnetic field for switching the normal component of the magnetic domain orientations within said medium, whereby said medium, by virtue of said overlapping track path, exhibits signal-ordered normally oriented magnetic domains in a residual unerased track which is narrow in relation to the width of the magnetic head, thereby providing an information bearing unit whereon the information is economically recorded by electromagnetic means and which exhibits the relatively high information packing density of a magneto-optic medium.

4. Magnetic recording apparatus adapted for recording information on an essentially planar magneto-optic medium of the type having a substantial proportion of magnetic domains with a preferred orientation providing a substantial magnetic component normal to the surface plane of said medium, the recorded information on such medium being adapted to be reproduced by relatively high resolution optical playback apparatus employing a polarization detection beam oriented at a relatively steep angle to the recording surface of such medium, said apparatus comprising:

a magnetic head;

track defining means for causing said magnetic head to pass substantially parallel and adjacent to the surface plane of such a medium in a preselected track pattern having substantial overlap between adjacent track portions, said magnetic head being adapted to produce a magnetic field component normal to the surface plane of the medium; and means for applying an information signal to said magnetic head, said signal causing said head to produce a magnetic field, the normal component of which being effective to switch the normal component of magnetic domain orientations in said medium, whereby narrow residual tracks may be produced on such medium, which tracks have ordered domain orientations substantially normal to the plane of such medium that are representative of said information signal, thereby providing recording apparatus, characterized by the economy of electromagnetic recording, for producing a recorded information density characteristic of magneto-optically readable storage media.

5. Magnetic recording apparatus according to claim 4 wherein said track pattern is a spiral.

6. Magnetic recording apparatus according to claim 4 wherein said track pattern is a series of parallel lines.

7. Magnetic recording/optical playback apparatus adapted for use with a planar magneto-optic medium having a substantial portion of magnetic domains with a preferred orientation providing a substantial magnetic component normal to the surface plane of the medium, said apparatus comprising:

means for receiving an information signal and for processing such a signal to a preselected recording format;

magnetic head means responsive to said processed information signal for generating a magnetic field representative of said signal;

means for causing relative motion between said magnetic head means and the surface plane of the magneto-optic medium to define a substantially overlapping track pattern, said magnetic field generated by said magnetic head means having a component normal to the surface plane of the recording medium, whereby the normal component of the magnetic field is effective to switch the orientation of the domains in the recording medium to record the information on the medium and whereby the substantial track overlapping leaves a relatively narrow residual track bearing the information; and optical playback means for producing an electrical signal based on domain orientations in said residual tracks, said optical playback means including a magneto-optic reader of the type using a focused light beam and means for directing said beam onto said residual record tracks at a relatively steep angle to the surface plane of the medium, thereby providing a record/playback apparatus embodying the economy of magnetic recording and the information storage density of magneto-optic storage media.

8. Magnetic recording/optical playback apparatus according to claim 7, wherein the information signal is a video signal and the recording format is a digital code.

9. Magnetic recording/optical playback apparatus according to claim 7, wherein the information signal is a video signal and the recording format is frequency modulation.

10. Magnetic recording/optical playback apparatus according to claim 7, wherein the track path is a spiral and adjacent track portions overlap by at least 80 percent.

11. Magnetic record/optical playback apparatus adapted for use with an essentially planar magneto-optic medium of the type having a substantil proportion of magnetic domains with a preferred orientation having a substantial magnetic component normal to the surface plane of said medium, said system comprising:

a magnetic head;

track defining means for causing relative movement between said magnetic head and the surface plane of such a medium in a preselected track pattern having substantial overlap between adjacent track portions;

means for applying an information signal to said magnetic head to produce a magnetic field corresponding to the signal, the magnetic field having a component normal to the surface of the magnetic medium, the normal component acting upon the magnetic domains of the medium having the preferred orientation to produce a recorded track bearing the signal information, the track overlapping producing a narrow residual track having ordered domain components normal to the plane of such medium that are representative of said information signal; and means for optically reading the information recorded in said narrow residual track, said means including high-resolution optical means incorporating a light beam for responding to the normal components of the magnetized medium, and for producing an electrical signal based thereon, and means for causing said light beam to scan along said residual track of said medium at a reslatively steep angle with respect to the surface of the medium, thereby providing a record/playback apparatus embodying the economy of magnetic recording and the information storage density of magneto-optic storage media.

12. The record/playback apparatus according to claim 11, wherein said optical means is of the reflection type employing the Kerr effect.

13. The record/playback apparatus according to claim 11, wherein said optical means is of the transmission type employing the Faraday effect.

14. The record/playback apparatus according to claim 11, wherein said magnetic head and said track defining means comprise a multigap recording head for simultaneously providing a set of overlapping recording tracks, said multigap recording head having:

a plurality of magnetic circuits which respectively have an independent coil for receiving electrical signals and an independent air gap adapted to produce a fringing field for magnetic recording; and means for holding said multigap recording head in a predefined orientation wherein the gaps are generally parallel and are shifted slightly, in relation to track width, in a direction parallel to said gaps.

* * * * *